US012223930B2

(12) United States Patent
Lee et al.

(10) Patent No.: US 12,223,930 B2
(45) Date of Patent: Feb. 11, 2025

(54) SPIRAL CURVE TYPE MUSIC SHEET, APPARATUS AND METHOD FOR PROVIDING SPIRAL CURVE TYPE MUSIC SHEET

(71) Applicant: DAEGU GYEONGBUK INSTITUTE OF SCIENCE AND TECHNOLOGY, Daegu (KR)

(72) Inventors: Kijoon Lee, Daegu (KR); Jun Tak Noh, Jeollabuk-do (KR); Han Gyeol Woo, Anyang-Si (KR); Jae Hyuk Lee, Ulsan (KR); Hye Jun Lee, Yongin-si (KR); Ji Ho Jang, Gyeongsangnam-do (KR); Jang Woo Choo, Busan (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 740 days.

(21) Appl. No.: 17/475,661

(22) Filed: Sep. 15, 2021

(65) Prior Publication Data

US 2022/0293072 A1 Sep. 15, 2022

(30) Foreign Application Priority Data

Mar. 12, 2021 (KR) ........................ 10-2021-0032874

(51) Int. Cl.
*G10G 1/02* (2006.01)
*G10G 1/04* (2006.01)
(Continued)

(52) U.S. Cl.
CPC ................. *G10G 1/02* (2013.01); *G10G 1/04* (2013.01); *G10G 3/04* (2013.01); *G10H 1/0008* (2013.01);
(Continued)

(58) Field of Classification Search
CPC .. G10G 1/02; G10G 1/04; G10G 3/04; G10H 1/0008; G10H 2210/086; G10H 2220/131; G10H 2250/235
(Continued)

(56) References Cited

U.S. PATENT DOCUMENTS 998,264 A * 7/1911 Sandell ..................... G10F 5/06 84/123
3,942,404 A * 3/1976 del Castillo .............. G04F 5/02 84/484
(Continued)

FOREIGN PATENT DOCUMENTS

CN 201077289 Y * 6/2008
CN 107393517 A * 11/2017 ........... G10H 1/0033
(Continued)

OTHER PUBLICATIONS

Korean Office Action dated May 24, 2022 issued in corresponding Korean Appln. No. 10-2021-0032874.
(Continued)

*Primary Examiner* — Christina M Schreiber
(74) *Attorney, Agent, or Firm* — Sughrue Mion, PLLC

(57) ABSTRACT

Disclosed are a spiral curve type music sheet in which different notes are displayed at different positions on a spiral curve based on the pitches of notes, and an apparatus and method for providing a spiral curve type music sheet. The apparatus for providing a spiral curve type music sheet may include a memory configured to store a spiral curve type music sheet in which different notes are displayed at different positions on a spiral curve based on the pitch of the note and note data, and a processor configured to determine the note symbol position related to the note data on the spiral curve in the spiral curve type music sheet based on the frequency of the note data.

12 Claims, 9 Drawing Sheets

(51) Int. Cl.
*G10G 3/04* (2006.01)
*G10H 1/00* (2006.01)

(52) U.S. Cl.
CPC . *G10H 2210/086* (2013.01); *G10H 2220/131* (2013.01); *G10H 2250/235* (2013.01)

(58) Field of Classification Search
USPC .......................................................... 84/609
See application file for complete search history.

(56) References Cited

U.S. PATENT DOCUMENTS

| | | | | | |
|---|---|---|---|---|---|
| 6,245,984 | B1 * | 6/2001 | Aoki | G10H 1/0025 84/611 |
| 6,448,487 | B1 * | 9/2002 | Smith | G10H 1/20 84/613 |
| 7,238,872 | B1 * | 7/2007 | Edwards | B42D 9/04 84/486 |
| 7,538,265 | B2 * | 5/2009 | Lemons | G09B 15/009 84/464 R |
| 7,928,306 | B2 * | 4/2011 | Lemons | G10G 1/00 84/464 R |
| 7,932,455 | B2 * | 4/2011 | Lemons | G10H 1/0008 84/464 R |
| 11,289,058 | B2 * | 3/2022 | Desai | G10H 1/0008 |
| 11,798,236 | B2 * | 10/2023 | Strachan | G06F 3/04815 |
| 2005/0190199 | A1 * | 9/2005 | Brown | G10H 3/125 345/600 |
| 2010/0122621 | A1 * | 5/2010 | Newstetter | G10G 1/02 84/314 R |
| 2010/0251875 | A1 * | 10/2010 | Johnston | G09B 15/02 84/483.2 |
| 2014/0041512 | A1 * | 2/2014 | Mastran | G09B 15/023 84/483.2 |
| 2016/0203805 | A1 * | 7/2016 | Strachan | G10H 1/0025 84/483.2 |
| 2019/0206376 | A1 * | 7/2019 | Strachan | G10G 1/02 |
| 2022/0293072 | A1 * | 9/2022 | Lee | G10H 1/383 |
| 2024/0046585 | A1 * | 2/2024 | Strachan | G10H 1/0008 |

FOREIGN PATENT DOCUMENTS

| | | | | | |
|---|---|---|---|---|---|
| CN | 114501217 | A | * | 5/2022 | |
| CN | 219686911 | U | * | 9/2023 | |
| CN | 220647457 | U | * | 3/2024 | |
| DE | 20301012 | U1 | * | 3/2003 | G09B 15/02 |
| EP | 3155609 | B1 | * | 7/2019 | G10H 1/0066 |
| JP | 2008096844 | A | * | 4/2008 | |
| JP | 2010072222 | A | * | 4/2010 | |
| JP | 2010217851 | A | * | 9/2010 | |
| JP | 2015008842 | A | * | 1/2015 | |
| JP | 2021099460 | A | * | 7/2021 | G06F 3/0482 |
| KR | 100621825 | B1 | * | 9/2006 | |
| KR | 10-2009-0038898 | A | | 4/2009 | |
| KR | 20090038898 | A | * | 4/2009 | |
| KR | 101945636 | B1 | | 2/2019 | |

OTHER PUBLICATIONS

J. Noh et al. "A Novel Method to Visualize Music and Sound" pp. 1-3, published 2020.

* cited by examiner

[FIG. 1]
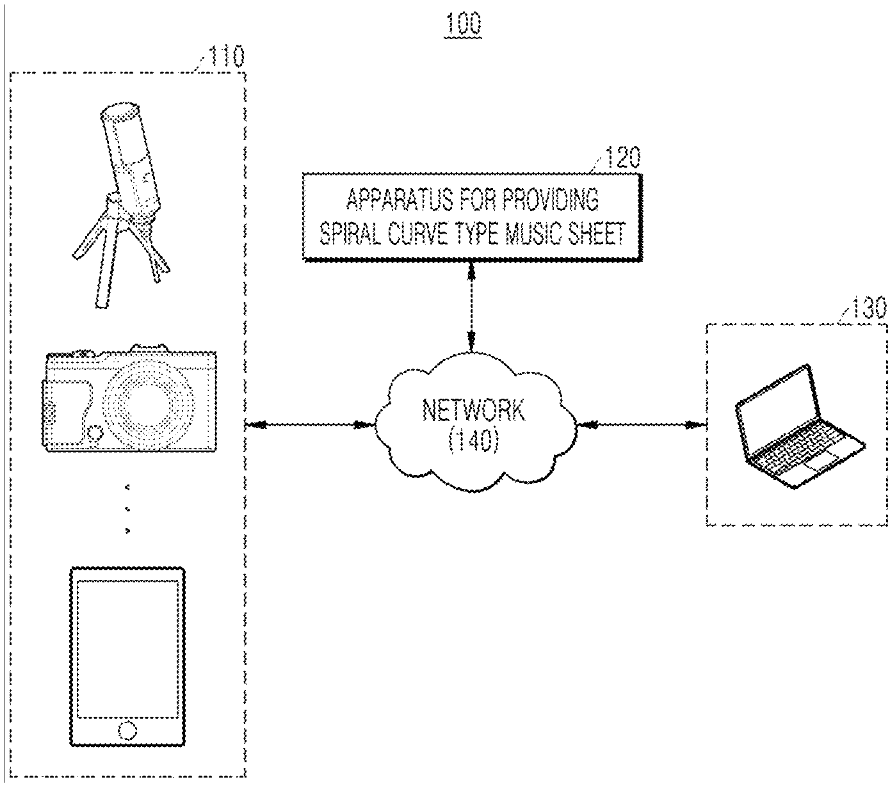
[FIG. 2]
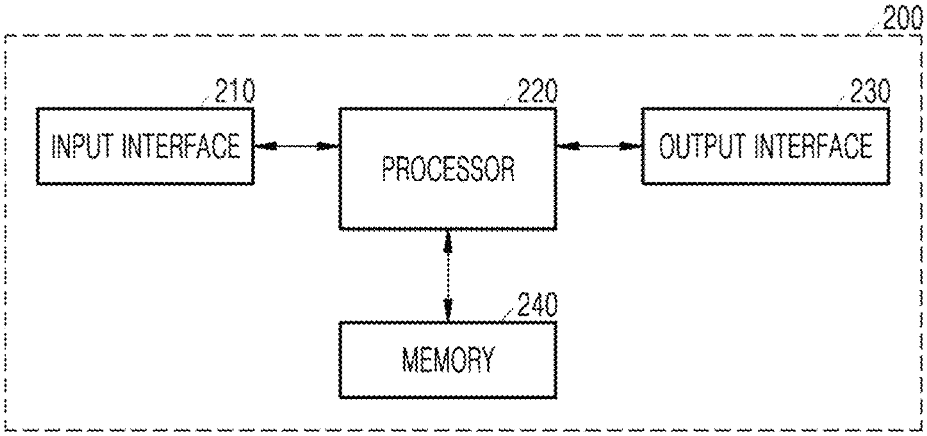

[FIG. 3A]
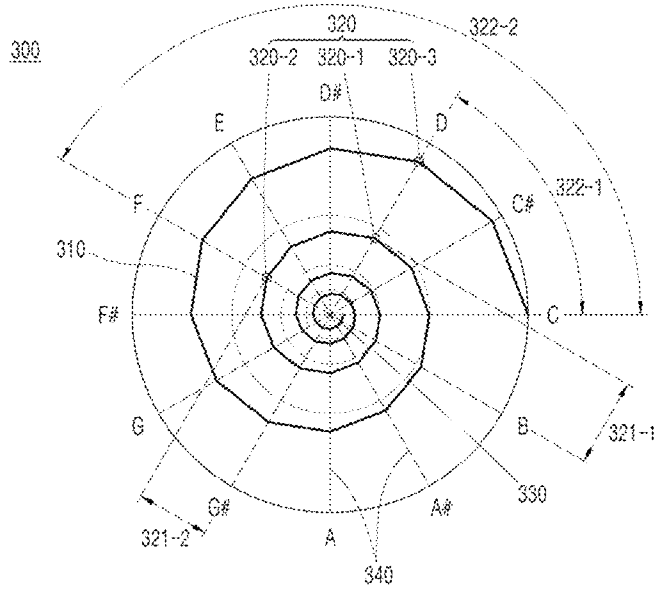
[FIG. 3B]
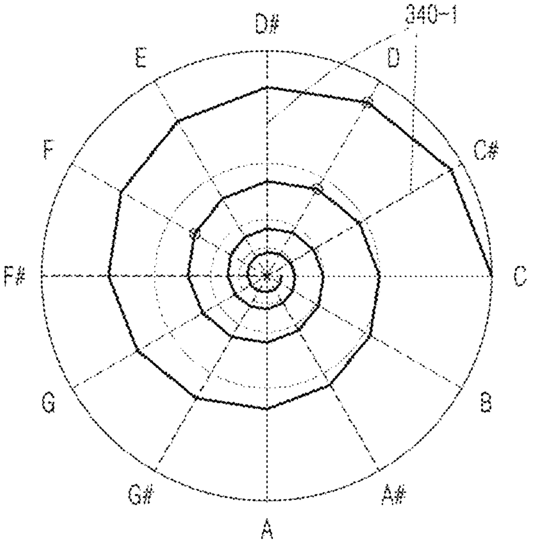

[FIG. 4A]
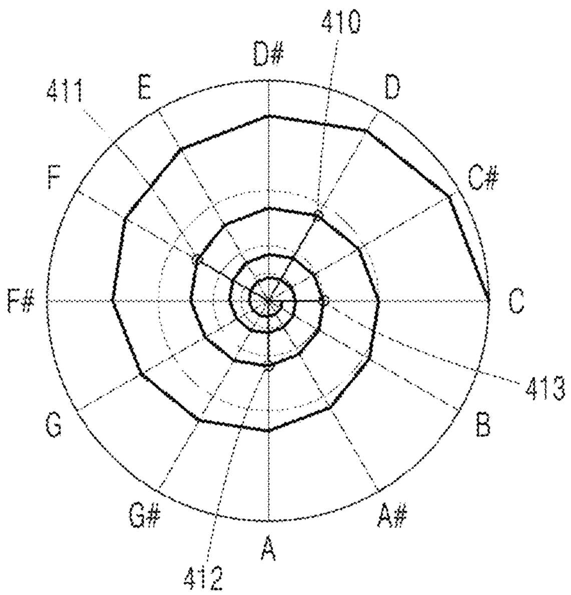
Iim7
[FIG. 4B]
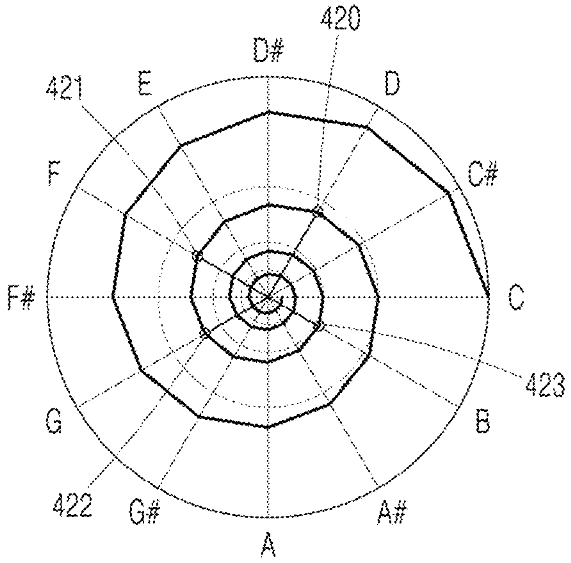
V7

[FIG. 4C]
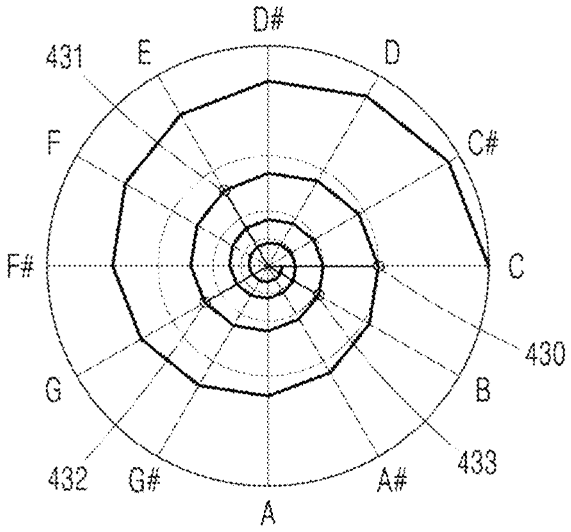
Imaj7
[FIG. 5A]
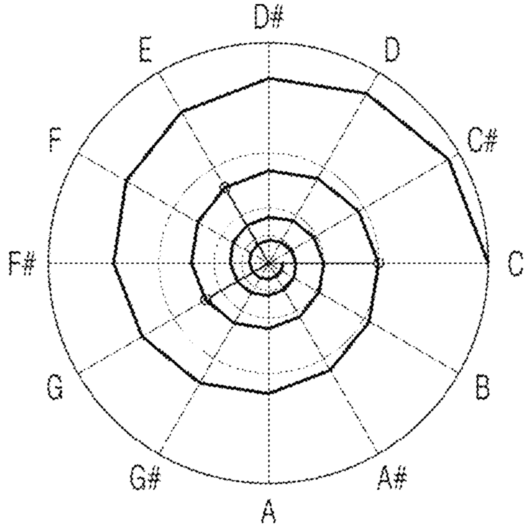
$C_{maj}$

[FIG. 5B]
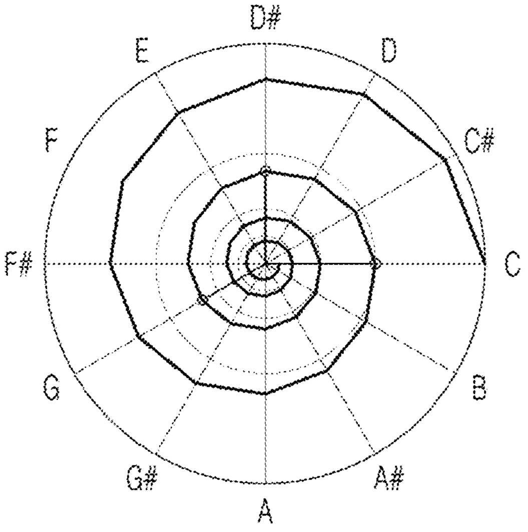

[FIG. 5C]
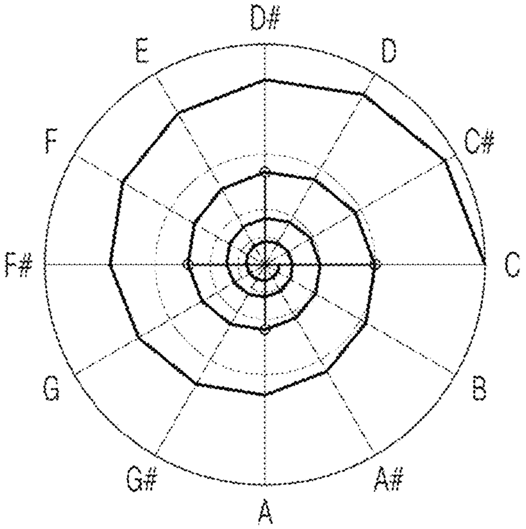
$C_{dim}$
[FIG. 5D]
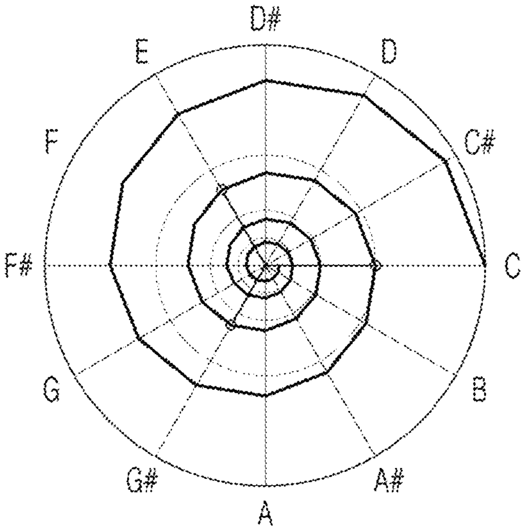
$C_{aug}$

[FIG. 6A]
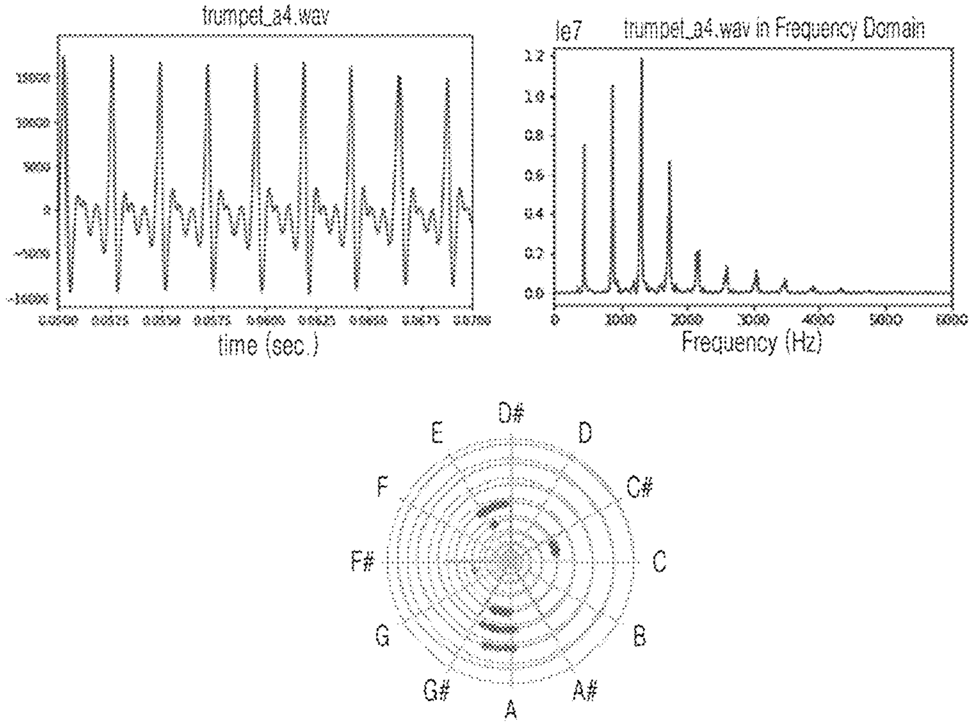
[FIG. 6B]
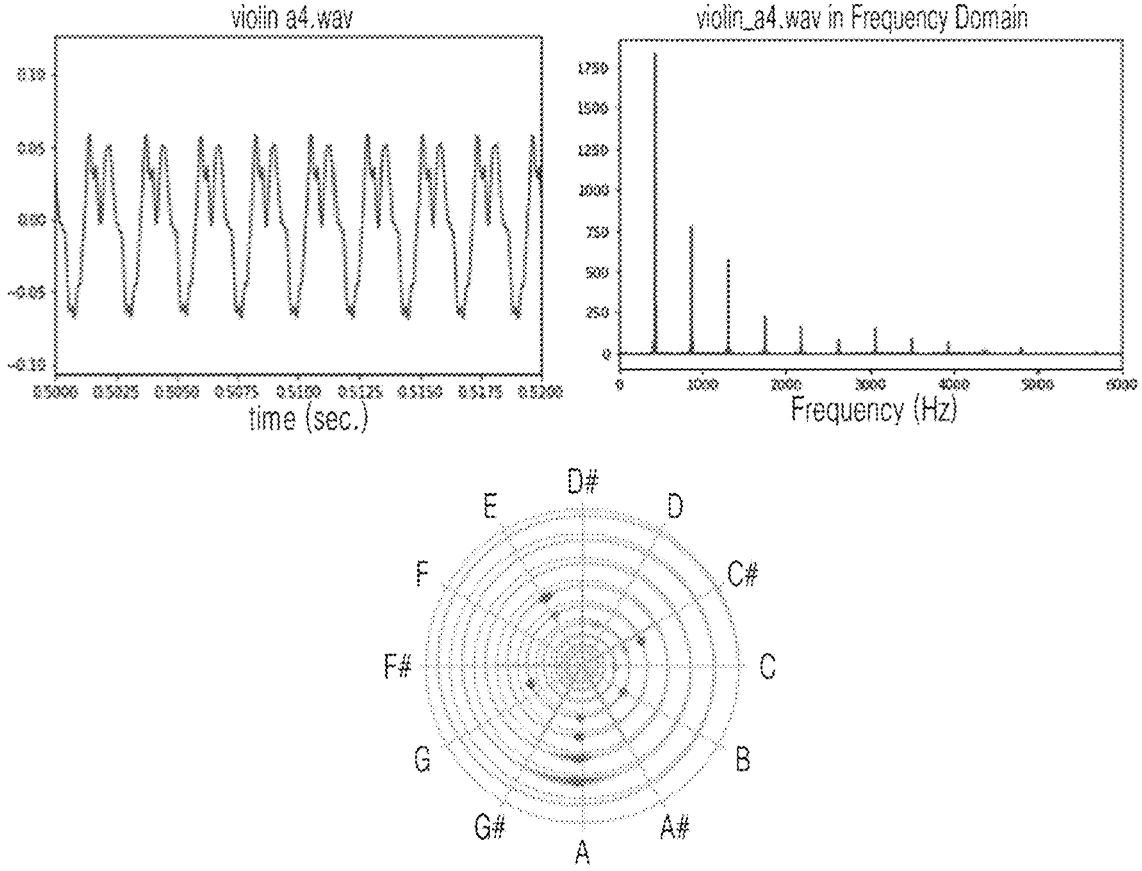

[FIG. 7A]
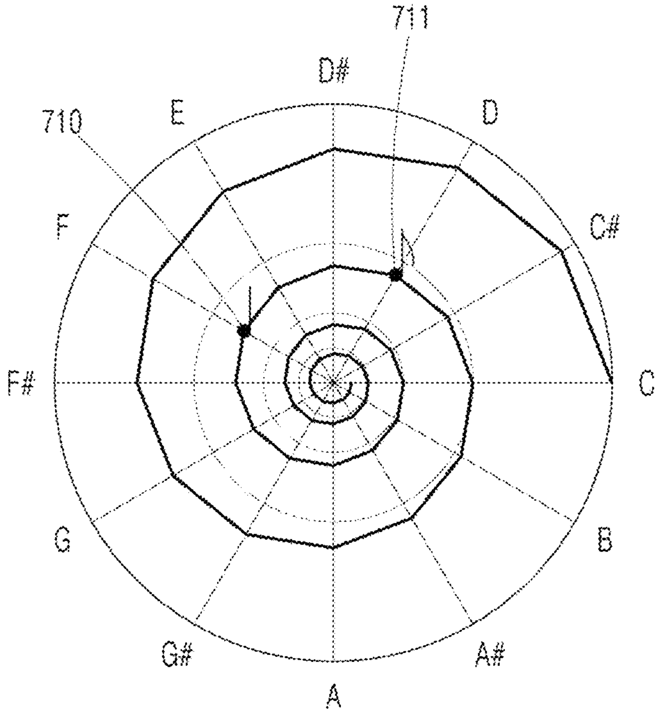
[FIG. 7B]
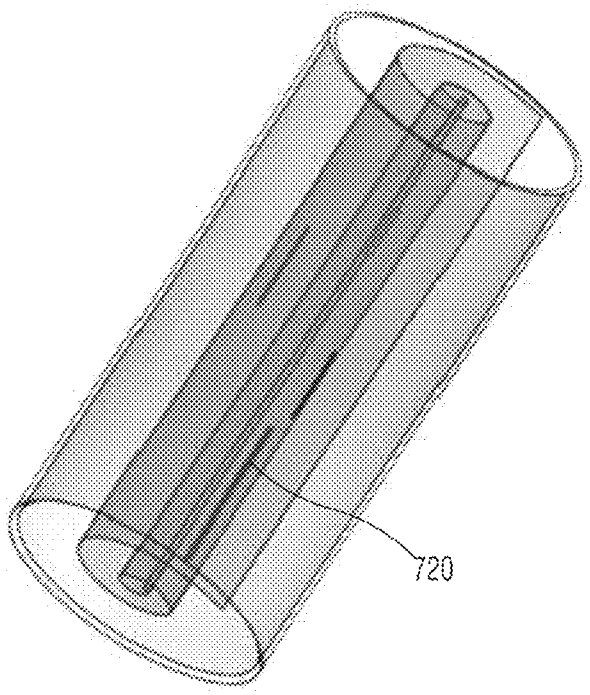

[FIG. 8]
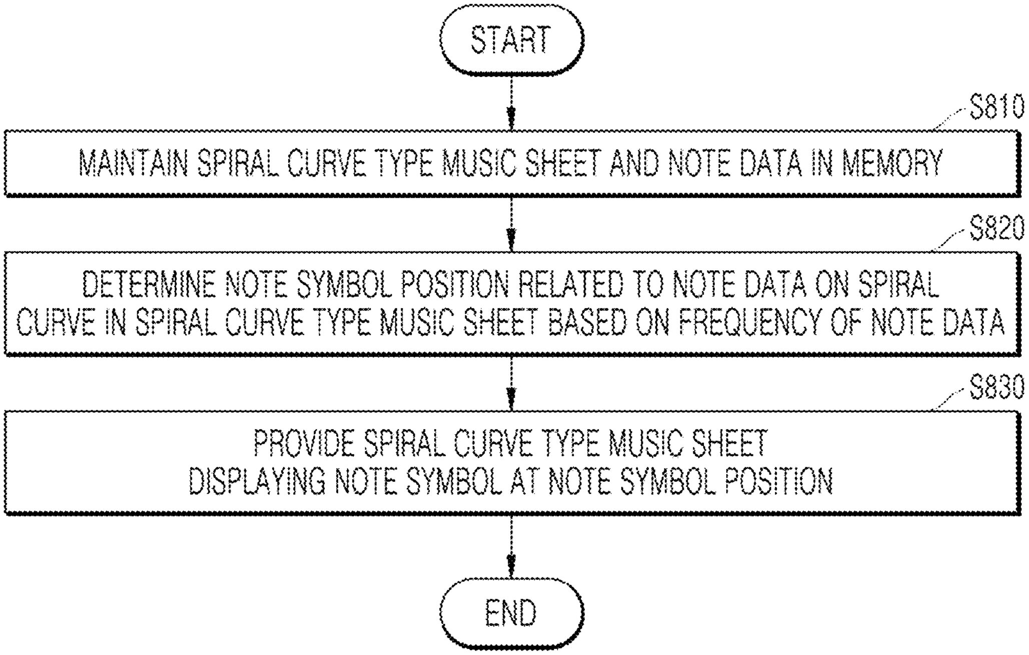

SPIRAL CURVE TYPE MUSIC SHEET, APPARATUS AND METHOD FOR PROVIDING SPIRAL CURVE TYPE MUSIC SHEET

STATEMENT REGARDING GOVERNMENT SUPPORT

This invention was supported at least in part by Ministry of Science and ICT of South Korean government for research project, the title of which is "Teacher Start-up Fund" (Project Number: 2020090019) conducted by DGIST (Daegu Gyeongbuk Institute of Science & Technology).

Also, this invention was supported at least in part by Ministry of Science and ICT of South Korean government for research project, the title of which is "Educational Innovation Activities" (Project Number: 2020010015) conducted by DGIST (Daegu Gyeongbuk Institute of Science & Technology).

CROSS-REFERENCE TO RELATED APPLICATION

This present application claims the benefit of priority to Korean Patent Application No. 10-2021-0032874, entitled "SPIRAL CURVE TYPE MUSIC SHEET, APPARATUS AND METHOD FOR PROVIDING SPIRAL CURVE TYPE MUSIC SHEET," filed on Mar. 12, 2021, in the Korean Intellectual Property Office, the entire disclosure of which is incorporated herein by reference.

FIELD

The present disclosure relates to a spiral curve type music sheet, and an apparatus and method for providing a spiral curve type music sheet in which different notes are displayed at different positions on a spiral curve based on pitches of notes.

BACKGROUND

In the existing music sheet display method (hereinafter, may be referred to as "musical notation"), a note is basically expressed by its pitch and duration.

For example, in the case of Western musical notation, a staff music sheet is used to record notes by arranging note symbols indicating different durations of notes on five horizontal lines in order to indicate pitches of notes.

The staff music sheet is generated along with the development of Western musical instruments and is optimized for playing keyboard instruments such as the piano. That is, white keys are located on one line or in a space between lines in the staff music sheet, and black keys may not be indicated without using a sharp (#) or flat (♭) symbol.

In addition, in the staff music sheet, since one key difference may denote either a whole tone or a semitone difference depending on the situation, when a 7th chord is built by adding a seventh note to a triad, it is very difficult to distinguish among major 7th chords, minor 7th chords, dominant 7th chords, half-diminished 7th chords, and the like.

The related art (Registration Patent No. 10-0621825) discloses a music sheet that may display all notes without using a sharp or a flat based on a base line, a center line, and an auxiliary line. However, in this prior document, as more lines than the staff music sheet are added to expand notes that may be displayed, it is not easy for users (for example, performers) to intuitively recognize notes expressed in a music sheet, and when chords are expressed in the music sheet, it is more difficult for users to recognize the chords.

Therefore, there exists a need for a musical notation that may easily express all notes (or chords) without using a sharp or flat symbol, and allows users to intuitively recognize notes (or chords).

SUMMARY

An aspect of the present disclosure is to allow a user to easily recognize notes based on a position of a note symbol by displaying all notes without using a sharp or flat symbol through a spiral curve type music sheet in which different notes are displayed at different positions on a spiral curve based on a pitch of the note.

In addition, an aspect of the present disclosure is to intuitively recognize chords through position differences between notations by determining a point on a spiral curve corresponding to a magnitude and a phase angle of each of a plurality of note data as a note symbol position, and displaying each note symbol at the determined note symbol position.

In addition, an aspect of the present invention is to enable various notes to be displayed unlike the existing music sheet in which it is difficult to display notes with a difference of more than one octave by providing a spiral curve type music sheet capable of displaying note data in multiple octaves.

In addition, an aspect of the present disclosure is to display not only the notes based on a 12 tone scale, but also those notes with any frequencies on a spiral curve type music sheet.

In addition, an aspect of the present disclosure is to visually express a tone of a musical instrument by displaying overtones obtained from a sound played with the musical instrument on a spiral curve type music sheet.

In addition, an aspect of the present disclosure is to easily transform an existing music sheet into a spiral curve type music sheet by creating note data from an existing music sheet and providing the spiral curve type music sheet that displays a note symbol related to the note data.

An embodiment of the present disclosure may be an apparatus and method for providing a spiral curve type music sheet in which different notes are displayed at different positions on a spiral curve based on the pitch.

The apparatus for providing a spiral curve type music sheet may include a memory configured to store a spiral curve type music sheet in which different notes are displayed on different positions in a spiral curve based on the pitch and note data, and a processor configured to determine a note symbol position related to the note data on the spiral curve in the spiral curve type music sheet based on the frequency of the note data.

An embodiment of the present disclosure may be a spiral curve type music sheet including a spiral curve in which different notes are displayed on different positions, and a note symbol displayed on a spiral curve based on the pitch of the note, in which the spiral curve is displayed in a vortex form on a plane.

An embodiment of the present disclosure may be a method of providing a spiral curve type music sheet implemented by an apparatus for providing a spiral curve type music sheet, the method including maintaining a spiral curve type music sheet, in which different notes are displayed at different positions on a spiral curve based on the pitch, and note data in a memory in the apparatus for providing a spiral curve type music sheet, and determining a note symbol position related to the note data on the spiral curve in the spiral curve type music sheet based on the frequency of the note data in the apparatus for providing a spiral curve type music sheet.

The above-mentioned aspects, features, and advantages and other aspects, features, and advantages will become obvious from the following drawings, claims, and detailed description of the present invention.

BRIEF DESCRIPTION OF THE DRAWINGS

The above and other aspects, features, and advantages of the present disclosure will become apparent from the detailed description of the following aspects in conjunction with the accompanying drawings, in which:

FIG. 1 is a diagram schematically illustrating a network environment including an apparatus for providing a spiral curve type music sheet according to an embodiment of the present disclosure;

FIG. 2 is a diagram schematically illustrating a configuration of the apparatus for providing a spiral curve type music sheet according to an embodiment of the present disclosure;

FIG. 3A and FIG. 3B is a diagram illustrating an example of a spiral curve type music sheet according to an embodiment of the present disclosure;

FIG. 4A, FIG. 4B and FIG. 4C is a diagram illustrating an example of displaying a chord on a spiral curve type music sheet in the apparatus for providing a spiral curve type music sheet according to the embodiment of the present disclosure;

FIG. 5A, FIG. 5B, FIG. 5C and FIG. 5D is a diagram illustrating another example of displaying a chord on a spiral curve type music sheet in the apparatus for providing a spiral curve type music sheet according to the embodiment of the present disclosure;

FIG. 6A and FIG. 6B is a diagram illustrating an example of displaying an overtone on a spiral curve type music sheet in the apparatus for providing a spiral curve type music sheet according to the embodiment of the present disclosure;

FIG. 7A and FIG. 7B is a diagram illustrating another example of the spiral curve type music sheet according to the embodiment of the present disclosure; and FIG. 8 is a flowchart illustrating a method of providing a spiral curve type music sheet according to an embodiment of the present disclosure.

DETAILED DESCRIPTION

Various advantages and features of the present disclosure and methods to accomplish them will become apparent from the description of embodiments with reference to the accompanying drawings. However, the present disclosure is not limited to the embodiments presented below, but may be implemented in a variety of different forms, and should be understood as including all conversions, equivalents or substitutes included in the spirit and scope of the present disclosure. The embodiments presented below are provided to make the disclosure of the present disclosure complete, and completely notify those with ordinary skill in the art to which the present disclosure belongs of the scope of the invention. When it is decided that the detailed description of the known art related to the present disclosure may obscure the gist of the present disclosure, the detailed description thereof will be omitted.

The terms used in the present application are only used to describe specific embodiments, and are not intended to limit the present disclosure. Singular forms are intended to include plural forms unless the context clearly indicates otherwise. It will be further understood that the terms "comprises" or "have" used in this specification, specify the presence of stated features, numerals, steps, operations, components, parts mentioned in this specification, or a combination thereof, but do not preclude the presence or addition of one or more other features, numerals, steps, operations, components, parts, or a combination thereof. Terms 'first', 'second', and the like, may be used to describe various components, but the components are not to be construed as being limited by the terms. The terms are used only to distinguish one component from another component.

Hereinafter, embodiments of the present disclosure will be described in detail with reference to the accompanying drawings. Like reference numerals designate like elements throughout the specification, and overlapping descriptions of the elements will not be provided.

FIG. 1 is a diagram schematically illustrating a network environment including an apparatus for providing a spiral curve type music sheet according to an embodiment of the present disclosure.

Referring to FIG. 1, a network environment 100 including an apparatus for providing a spiral curve type music sheet includes an input device 110, an apparatus 120 for providing a spiral curve type music sheet, an output device 130, and a network 140.

The input device 110 may be, for example, a microphone, a camera, a tablet personal computer (PC), a scanner, or the like.

Specifically, when the input device 110 is the microphone or the camera, the input device 110 may receive an external sound (for example, a sound played on a musical instrument) and transmit the received external sound to the apparatus 120 for providing a spiral curve type music sheet.

When the input device 110 is the camera or the scanner, a music sheet (for example, staff music sheet and spiral curve type music sheet) may be photographed or scanned to generate a music sheet image, and transmit the music sheet image to the apparatus 120 for providing a spiral curve type music sheet.

Further, when the input device 110 is the tablet PC, the input device 110 may transmit a music sheet image (or a music sheet file) stored or written in the tablet PC to the apparatus 120 for providing a spiral curve type music sheet.

When a sound is received from the input device 110, the apparatus 120 for providing a spiral curve type music sheet may extract a frequency from the sound, generate note data based on the frequency, and store the generated note data in a memory. Here, the note data may be digital information on the corresponding note, and may be stored in the memory together with information on at least one of a frequency extracted from the sound, and a duration and an intensity of the note data. Also, the note data may be in a form in which a position of the corresponding note in the music sheet is stored as data so that the note data is suitable for a music sheet format.

When the music sheet image (or music sheet file) is received from the input device 110, the apparatus 120 for providing a spiral curve type music sheet may extract a note symbol from the music sheet image (or music sheet file), generate note data based on the note symbol position, and store the generated note data in memory. The apparatus 120 for providing a spiral curve type music sheet may, for example, further generate information on at least one of a duration and an intensity of the note data based on a shape and color of the notation, and store the generated information in the memory together with the note data. In this case, the apparatus 120 for providing a spiral curve type music sheet may identify whether the music sheet in the music sheet image (or the music sheet file) is a staff music sheet or a spiral curve type music sheet, and generate the note data (or, duration and intensity) based on a preset note symbol display standard of the identified music sheet.

The apparatus 120 for providing a spiral curve type music sheet may determine the note symbol position related to the note data on the spiral curve in the spiral curve type music sheet based on the frequency of the note data, and transmit to the output device 130 the spiral curve type music sheet in which the note symbol related to the note data is displayed at the note symbol position. In this case, the apparatus 120 for providing a spiral curve type music sheet may display different shapes and colors of notations based on the duration and the intensity of note data.

The apparatus 120 for providing a spiral curve type music sheet may display the note data generated from the sound on the spiral curve type music sheet and transmit the displayed note data to the output device 130, so that a sound acquired at a performance site may be easily expressed in the spiral curve type music sheet.

In addition, the apparatus 120 for providing a spiral curve type music sheet may display the note data generated from the music sheet image (or music sheet file) on the spiral curve type music sheet and transmit the displayed note data to the output device 130, thereby easily transforming the existing staff music sheet into the spiral curve type music sheet as well as transmitting pre-written or edited music sheets.

The output device 130 may be, for example, a display device (for example, a tablet PC and a notebook computer), and may display the spiral curve type music sheet received from the apparatus 120 for providing a spiral curve type music sheet on a screen.

In an embodiment, the input device 110 and the output device 130 may be located outside the apparatus 120 for providing a spiral curve type music sheet, but is not limited thereto, and at least some of the components of the input device 110 and the output device 130 may be included in the apparatus 120 for providing a spiral curve type music sheet.

The network 140 may connect the input device 110, the apparatus 120 for providing a spiral curve type music sheet, and the output device 130. The network 140 may be, for example, a wired network such as local area networks (LANs), wide area networks (WANs), metropolitan area networks (MANs), and integrated service digital networks (ISDNs), or a wireless network such as wireless LANs, CDMA, Bluetooth, and satellite communication, but the scope of the present disclosure is not limited thereto. In addition, the network 140 may transmit and receive information using short-range communication and/or long-range communication. Here, the short-range communication may include Bluetooth, radio frequency identification (RFID), infrared data association (IrDA), ultra-wideband (UWB), ZigBee, and wireless fidelity (Wi-Fi) technologies, and the long-range communication may include code division multiple access (CDMA), frequency division multiple access (FDMA), time division multiple access (TDMA), orthogonal frequency division multiple access (OFDMA), and single carrier frequency division multiple access (SC-FDMA) technologies.

FIG. 2 is a diagram schematically illustrating a configuration of the apparatus for providing a spiral curve type music sheet according to an embodiment of the present disclosure.

Referring to FIG. 2, an apparatus 200 for providing a spiral curve type music sheet according to an embodiment of the present disclosure may include an input interface 210, a processor 220, an output interface 230, and a memory 240.

The input interface 210 may include, for example, a microphone, a camera, a graphical user interface (GUI), and the like. The input interface 210 may receive, for example, an external sound through the microphone or the camera, or receive a written (edited) music sheet (for example, a staff music sheet and a spiral curve type music sheet) through a GUI (for example, a mouse and a touch pen).

The processor 220 may generate note data based on a sound or a music sheet input from the input interface 210, and store the generated note data in the memory 240. In this case, the processor 220 may extract a frequency from the sound input through the input interface 210, generate note data based on the frequency, and store the generated note data in the memory 240. The processor 220 may further extract information on at least one of a duration and an intensity of the note data from the sound and store the extracted information in the memory 240 together with the note data.

The processor 220 may determine a notation position related to the note data on the spiral curve in the spiral curve type music sheet based on the frequency of the note data. Here, the spiral curve type music sheet may match a two-dimensional polar coordinate complex plane.

In this case, the processor 220 may calculate the magnitude and phase angle of the note data in the polar coordinate complex plane based on the frequency of the note data generated from the sound input from the input interface 210 or acquired from the memory 240. Here, the note data may be, for example, data for any one of the 12 tone scales (for example, C, $C^{\#}$, D, E, F, G, $G^{\#}$, A, $A^{\#}$, and B), but is not limited thereto, and the note data may be data for a microtone in-between.

The processor 220 may match the note data to the polar coordinate complex plane, and may represent the note data in the form of a complex number of [Equation 1].

$$z=\rho e^{i\phi} \quad \text{[Equation 1]}$$

The processor 220 may calculate the magnitude (ρ) and the phase angle (ϕ) of the note data by [Equation 2].

$$\rho=\rho_0/f$$

$$\phi=2\pi\log_2(f/f_0) \quad \text{[Equation 2]}$$

Here, ρ denotes the magnitude of the note data, and ρ0 denotes an arbitrary constant preset to determine a range occupied by an audible frequency in the polar coordinate complex plane. f denotes the frequency of the note data.

In addition, ϕ denotes the phase angle of the note data, and f0 denotes a frequency at which the phase angle (ϕ) becomes 0 and may be preset.

In [Equation 2], the magnitude (ρ) of the note data decreases as a note (or frequency of a note) increases, and the phase angle (ϕ) may increase counterclockwise as the note (or frequency of the note) increases, but is not limited thereto, and may be variously deformed. For example, [Equation 2] may be modified so that the magnitude (ρ) of the note data is proportional to the frequency, so that it becomes smaller as the sound decrease, or the phase angle (ϕ) increases clockwise as the frequency decreases.

The processor 220 may determine a point on the spiral curve corresponding to the magnitude and phase angle of the note data as a note symbol position related to the note data. Here, the note symbol positions may be radially disposed, spaced apart from each other around the central point on the spiral, and may be determined as any one of a plurality of points where the spiral intersects with a plurality of radiating lines corresponding to different musical scales, respectively. Here, the plurality of radiating lines may include, for example, 12 radiating lines corresponding to C, C#, D, D#, E, F, F#, G, G#, A, A# and B, for example, spaced apart by 30° intervals.

Specifically, the note symbol positions of different note data within the same octave may be determined as note symbol positions having different distances and phase angles from the central point. For example, a note symbol position of D and a note symbol position of F within the same octave may be determined as note symbol positions having different distances and phase angles from the central point. In this case, the distance from the central point with respect to the note symbol position of F may be smaller than the distance from the central point with respect to the note symbol position of D, and the phase angle with respect to the note symbol position of F may be greater than the phase angle with respect to the note symbol position of D.

In addition, each note symbol position of octave note data having only different octaves is determined as note symbol positions having different distances from the central point and the same phase angle. That is, each note symbol position of the octave note data being only different by octaves may be points on the same radiating line intersecting the spiral as the phase angles are the same.

Here, the octave note data being only different by octaves may mean, for example, low C (C3) and middle C (C4) that are 1 octave apart, or middle C and high C (C5) that are 1 octave apart. In this case, the distance from the central point with respect to the note symbol position of low C may be twice the distance from the central point to a note symbol position of middle C. That is, the closer to the central point, the higher the note data may be.

The processor 220 may display the spiral curve type music sheet in which the note symbol related to the note data is displayed at the note symbol position through the output interface 230. In this case, the radiating line related to the semitone among the plurality of radiating lines in the spiral curve type music sheet may be displayed in different colors or different forms from other radiating lines. That is, the processor 220 may display radiations associated with musical scales expressed as sharp # or flat ♭ in the staff music sheet among the plurality of radiations in different colors or shape from other radiations, thereby easily recognizing the note data related to the semitone. Here, the note data related to the semitone may be, for example, C#, D#, F#, G#, and A#, which are note data corresponding to black keys (semitone keys) of the piano, and other radiating lines not related to semitones may be, for example, C, D, E, F, G, A, and B, and may be note data corresponding to white keys (whole tone keys) of the piano.

When a plurality of note data corresponding to a chord is generated (acquired), the processor 220 may determine points on the spiral corresponding to the magnitudes and phase angles of each of the plurality of note data as notation positions, and display each note symbol at the determined note symbol positions, thereby intuitively recognizing the chord based on the position difference between the note symbols.

Also, the processor 220 may differently display the note symbols on the spiral curve type music sheet based on the duration of the note data. For example, when the duration of the note data is a quarter note, the processor 220 may display the notation in the form corresponding to a quarter note on the spiral curve type music sheet, thereby allowing the user to easily recognize the duration of the note data. In this case, the processor 220 may display different colors of the note symbol based on the intensity of the note data. For example, the processor 220 may display a note symbol related to note data having relatively strong intensity in a darker color than a note symbol related to note data having relatively weak intensity.

In an embodiment, the processor 220 may provide a two-dimensional spiral curve type music sheet through the output interface 230, but is not limited thereto, and may provide a three-dimensional spiral curve type music sheet. Specifically, the processor 220 may display, on the display, a spiral curve type music sheet in the form of a three-dimensional roll in which the spiral curve is extended in a direction (time axis direction) perpendicular to the spiral curve on the plane. In this case, the processor 220 may extend the length of the note symbol by duration of the note data in the direction perpendicular to the spiral curve and display the note symbol on the spiral curve type music sheet.

When the three-dimensional spiral curve type music sheet is provided, the processor 220 may display the three-dimensional spiral curve type music sheet by rotating the three-dimensional spiral curve type music sheet in various directions by supporting 3D rendering software. In this case, the processor 220 causes note symbols on the spiral curve type music sheet to be repeatedly generated and erased according to a progress of a music including a plurality of note data to display only valid note symbols (note symbols that fall within a preset time based on the progress of the music), thereby easily recognizing the corresponding note symbols.

In an embodiment, the processor 220 may perform Fourier transformation on a sound input through the input interface 210, and transform the sound into a plurality of note data having different frequencies. Here, the plurality of note data may be an overtone (harmonics) in which a frequency takes the value of integer multiple of the fundamental frequency.

The processor 220 may determine the points on the spiral curve corresponding to the magnitudes and phase angles of each of the plurality of note data corresponding to the overtone as the note symbol positions, and display the note symbols at the determined note symbol positions, thereby visually expressing the tone of the musical instrument. That is, even if the plurality of note data corresponding to the overtone has the same frequency (for example, 440 Hz), the processor 220 may express a tone that changes according to different waveforms of the plurality of note data.

In this case, the processor 220 may display the overtone on the spiral curve type music sheet only when the overtone function is activated according to the user's selection.

Also, the processor 220 may identify a type of musical instruments based on the plurality of note data, and may recommend musical instruments suitable for the plurality of note data by displaying the type of musical instruments on the spiral curve type music sheet together.

In an embodiment, the processor 220 may output a performance sound of the musical instruments corresponding to the plurality of note data through the output interface 230 in response to a sound output request for a plurality of note data (or spiral curve type music sheet).

The output interface 230 may be, for example, a display or a speaker. Here, the display may display the spiral curve type music sheet in which the note symbols are displayed at the note symbol position of each note data under the control of the processor 220.

The memory 240 may store the spiral curve type music sheet in which different notes are displayed at different positions on the spiral curve based on the pitches of the notes and the note data. Also, the memory 240 may further store at least one of the duration, intensity, and frequency of the note data.

FIG. 3A and FIG. 3B is a diagram view showing an example of a spiral curve type music sheet according to an embodiment of the present disclosure.

Referring to FIG. 3A, the spiral curve type music sheet 300 may include a spiral curve 310 and a note symbol 320.

The spiral curve 310 may be displayed, for example, in a form that proceeds outward from a center point in a spiral shape on a plane, and different notes may be displayed at different positions.

The note symbol 320 may be displayed on the spiral curve 310 based on the pitch of the note. The note symbols 320 may be radially disposed, spaced apart from each other about the central point 330, and may be displayed at any one of a plurality of points where a plurality of radiating line 340 and spiral curves each corresponding to different scales intersect. Here, as the notation 320 is located closer to the center point 330, the note may correspond to a higher note.

At this time, a first note symbol 320-1 and a second note symbol 320-2 related to different notes within the same octave may be displayed at points where distances 321-1 and 321-2 from the center point and phase angles 322-1 and 322-2 therefrom may be different. In addition, the first note symbol 320-1 and the third note symbol 320-3 related to octave notes (octave note data) having different octaves may be displayed at points where distances from the center point 330 are different and a phase angle is the same. That is, the first notation 320-1 and the third notation 320-3 may be spaced apart from each other and displayed in the same direction. In this case, the distance from the center point 330 with respect to the third notation 320-3 may be twice as long as the distance from the center point 330 with respect to the first notation 320-1.

The spiral curve type music sheet 300 may display note symbols related to notes within a plurality of octaves, thereby solving a problem in which notes having a difference in octave in the existing music sheet may not be displayed together.

Referring to FIG. 3B, in an embodiment, some of the plurality of radiating lines in the spiral curve type music sheet 300 may be displayed to be distinguished from other radiating lines. For example, in the spiral curve type music sheet 300, a radiating line 340-1 whose corresponding scale is associated with a semitone may be displayed in a different color or in a different shape from other radiating lines. Accordingly, the user may easily recognize note data (for example, $C^{\#}$, $D^{\#}$, $F^{\#}$, $G^{\#}$, and $A^{\#}$) corresponding to the black keys of the piano.

FIG. 4A, FIG. 4B and FIG. 4C is a diagram illustrating an example of displaying a chord on a spiral curve type music sheet in the apparatus for providing a spiral curve type music sheet according to an embodiment of the present disclosure.

Referring to FIG. 4A (IIm7 chord), the apparatus for providing a spiral curve type music sheet may display, for example, 7 chords of II-V-I on the spiral curve type music sheet. Specifically, the apparatus for providing a spiral curve type music sheet may calculate the magnitudes and phase angles of the note data based on the frequency of the note data of 'Re 410-Fa 411-La 412-Do 413', and may display the note symbols related to the note data on the spiral curve type music sheet at the points on the spiral curve corresponding to the magnitudes and phase angles of the note data.

Referring to FIG. 4B (V7 chord), the apparatus for providing a spiral curve type music sheet may calculate the magnitudes and phase angles of the note data based on the frequency of the note data of 'Re 420-Fa 421-Sol 422-Si 423', and may display the note symbol related to the note data at the point on the spiral curve corresponding to the magnitude and phase angle of the note data.

Referring to FIG. 4C (Imaj7 chord), Specifically, the apparatus for providing a spiral curve type music sheet may calculate the magnitudes and phase angles of the note data based on the frequencies of the note data of 'Do 430-Mi 431-Sol 432-Si 433', and may display the note symbols related to the note data on the spiral curve type music sheet at the points on the spiral curve corresponding to the magnitudes and phase angles of the note data.

In the IIm7 chord, an angle between Re (D) 410-Fa (F) 411 is 90°, and an angle between Fa (F) 411-La (A) 412 is 120°, and an angle between Ra (A) 412-Do (C) 413 is 90°. The IIm7 chord in which no two notes are 180° apart forms a 'minor 7th chord'.

In the V7 chord, the angle between Fa (F) 421-Si (B) 423 is 180°. The V7 chord forms the 'dominant 7th chord'.

In the Imaj7 chord, no two notes are 180° apart. The Imaj7 chord forms a major 7th chord different from the minor 7th chord.

The apparatus for providing a spiral curve type music sheet provides the spiral curve type music sheet in which the notations of the plurality of note data corresponding to the chord are displayed, so the user may intuitively recognize the chord through the position difference between the note symbols.

FIG. 5A, FIG. 5B, FIG. 5C and FIG. 5D is a diagram illustrating another example of displaying a chord on a spiral curve type music sheet in the apparatus for providing a spiral curve type music sheet according to the embodiment of the present disclosure.

Referring to FIG. 5A, FIG. 5B, FIG. 5C and FIG. 5D, the apparatus for providing a spiral curve type music sheet may display, on the spiral curve type music sheet, for example, a major triad, a minor triad, a diminished 7th chord, and an augmented triad with C as a root.

Here, in the diminished 7th chord and the augmented triad, the interval between the included notes is uniform. That is, an angle between notes in the diminished 7 chord is 90°, and an angle between notes in the augmented triad is 120°. A chord formed of such a uniform angle gives a feeling of atonality because it is impossible to distinguish which one is the root. In this way, the user may more easily recognize the corresponding chord through the angle between the notes.

FIG. 6A and FIG. 6B is a diagram illustrating an example of displaying an overtone on a spiral curve type music sheet in the apparatus for providing a spiral curve type music sheet according to the embodiment of the present disclosure.

Referring to FIG. 6A and FIG. 6B, the apparatus for providing a spiral curve type music sheet may visually express a tone of a musical instrument by displaying an overtone obtained from a sound played on the musical instrument on the spiral curve type music sheet. In this case, the apparatus for providing a spiral curve type music sheet may display the overtone on the spiral curve type music sheet according to the user's selection only when the overtone function is activated.

Specifically, the apparatus for providing a spiral curve type music sheet may receive a sound played on a musical instrument, and transform the received sound into a plurality of note data having different frequencies through Fourier transformation. Here, the plurality of note data may be an overtone (harmonics) whose frequency is an integer multiple of fundamental frequency. In addition, the plurality of note data may include, for example, at least one of data among 12 tone scales or data for a microtone in-between.

The apparatus for providing a spiral curve type music sheet may display the note symbols at the points on the spiral curve corresponding to the magnitudes and phase angles of each of a plurality of note data, and may display the spiral curve type music sheet in which the note symbol is displayed.

For example, the apparatus for providing a spiral curve type music sheet may acquire a 440 Hz sound waveform and a power spectrum for a sound played on the trumpet as illustrated in FIG. 6A, and acquire a plurality of note data having different frequencies based on the acquired 440 Hz sound waveform and power spectrum. The apparatus for providing a spiral curve type music sheet may be provided by displaying the notations related to the plurality of note data on the spiral curve type music sheet. In this case, the apparatus for providing a spiral curve type music sheet may treat the sound played on the trumpet as time series data, and perform a short-time Fourier transformation in real time to display the plurality of transformed note data on the spiral curve type music sheet. Here, the apparatus for providing a spiral curve type music sheet may display many overtones by displaying the note symbol so that the distance from the central point is proportional to a logarithm of a wavelength.

In addition, the apparatus for providing a spiral curve type music sheet may acquire a 440 Hz sound waveform and a power spectrum for a sound played on the violin as illustrated in FIG. 6B, and acquire a plurality of note data having different frequencies based on the acquired 440 Hz sound waveform and power spectrum. The apparatus for providing a spiral curve type music sheet may be provided by displaying the note symbols related to the plurality of note data on the spiral curve type music sheet. In this case, similar to the sound played on the trumpet, the apparatus for providing a spiral curve type music sheet may treat the sound played on the violin as time series data, and perform short-time Fourier transformation in real time to display the notations of the plurality of transformed note data on the spiral curve type music sheet.

FIG. 7A and FIG. 7B is a diagram illustrating another example of the spiral curve type music sheet according to the embodiment of the present disclosure.

Referring to FIG. 7A and FIG. 7B, the apparatus for providing a spiral curve type music sheet may display a duration of note data on the spiral curve type music sheet.

Specifically, the apparatus for providing a spiral curve type music sheet may differently display the note symbols on the flat spiral curve type music sheet based on the duration of the note data to display the duration of the note data on the spiral curve type music sheet. For example, as illustrated in FIG. 7A, the apparatus for providing a spiral curve type music sheet may display a note symbol 710 corresponding to quarter note at a note symbol position when the duration of the note data is quarter note and display a note symbol 711 corresponding to an eighth note at a note symbol position when the duration of the note data is the eighth note, thereby enabling a user to easily recognize the duration as well as the musical scales. Here, the form of the note symbol for each duration may use, for example, the method used in the staff music sheet as is, but is not limited thereto.

In an embodiment, the apparatus for providing a spiral curve type music sheet may display the duration of the note data based on the shape (type) of the note symbol 710, but the present disclose is not limited thereto, and may display the duration of the note data, for example, based on the size of the note symbol (that is, the size of the circle), and the brightness (darkness) of the note symbol, and the like.

The apparatus for providing a spiral curve type music sheet may display not only the duration of note data, but also the intensity of note data on the spiral curve type music sheet. In this case, the apparatus for providing a spiral curve type music sheet may display the intensity of the note data using, for example, a preset color change.

Also, the apparatus for providing a spiral curve type music sheet may extend and display the duration of the note symbol by the lengths of the note data in the spiral curve type music sheet in the three-dimensional roll form in which the spiral curve is extended in the direction perpendicular to the spiral curve on the plane, thereby displaying the duration of the note data on the spiral curve type music sheet. For example, as illustrated in FIG. 7B, when the duration of the note data is a quarter note, the apparatus for providing a spiral curve type music sheet may display the note symbol 720 on the three-dimensional spiral curve type music sheet by extending the length of the notation 720 by 1 cm length corresponding to a quarter note in the direction perpendicular to the spiral curve.

FIG. 8 is a flowchart illustrating a method of providing a spiral curve type music sheet according to an embodiment of the present disclosure.

Referring to FIG. 8, in step S810, the apparatus for providing a spiral curve type music sheet may maintain a spiral curve type music sheet, in which different notes are displayed on different positions on a spiral curve based on a pitch of a note, and note data in a memory. In this case, the note data may be a sound input from the outside or information obtained from a music sheet, and may be stored in the memory together with the duration, the intensity, and the frequency of the note data.

In step S820, the apparatus for providing a spiral curve type music sheet may determine the note symbol position related to the note data on the spiral curve in the spiral curve type music sheet based on a frequency of the note data. Here, the spiral curve type music sheet may match a two-dimensional polar coordinate complex plane.

For the note symbol positioning, first, the apparatus for providing a spiral curve type music sheet may calculate the magnitude and phase angle of the note data in the polar coordinate complex plane based on the frequency of the note data generated from the sound input from the outside or acquired from memory. The apparatus for providing a spiral curve type music sheet matches the note data to the polar coordinate complex plane, and may be represented in the form of the complex number of [Equation 1], and may calculate the magnitude $\rho$ and phase angel $\phi$ of the note data by [Equation 2].

Thereafter, the apparatus for providing a spiral curve type music sheet may determine the point on the spiral curve corresponding to the magnitude and phase angle of the note data as the note symbol position related to the note data. Here, the note symbol positions may be radially disposed, spaced apart from each other around the central point, and may be determined as any one of a plurality of points where the spiral intersects with a plurality of radiating lines corresponding to different musical scales, respectively. Here, the plurality of radiating lines may include, for example, 12 radiating lines corresponding to C, C#, D, D#, E, F, F#, G, G#, A, A# and B, for example, spaced apart by 30°.

Specifically, the note symbol positions of different note data within the same octave may be determined as note symbol positions having different distances and phase angles from the central point. In addition, each note symbol position of octave note data having only octave differences (for example, low C and middle C having 1 octave difference) is determined as note symbol positions having different distances from the central point and the same phase angle.

In step S830, the apparatus for providing a spiral curve type music sheet may display the note symbol related to the note data at the note symbol position, and provide the spiral curve type music sheet in which the note symbol is displayed. In this case, the apparatus for providing a spiral curve type music sheet may provide each of the plurality of note symbols related to the plurality of note data on the spiral curve type music sheet when the plurality of note data corresponding to a chord is generated (acquired), thereby immediately recognizing the chord based on the position difference between the note symbols.

Among the plurality of radiating lines in the spiral curve type music sheet, the radiating lines related to semitone (for example, radiating line corresponding to C#, D#, F#, G#, and A#, and radiating line related to the black keys of the piano) may be displayed in different colors or different forms from other radiating lines (for example, radiating lines corresponding to C, D, E, F, G, A, and B, and radiating lines related to the white keys of the piano). As a result, the user may easily recognize the note data related to the semitone.

In addition, the apparatus for providing a spiral curve type music sheet may display the duration of the note data on the two-dimensional spiral curve type music sheet. For example, the apparatus for providing a spiral curve type music sheet may differently display the note symbol on the spiral curve type music sheet based on the duration of the note data. In addition, the apparatus for providing a spiral curve type music sheet may display different colors of the note symbols based on the intensity of note data. For example, the apparatus for providing a spiral curve type music sheet may display a note symbol related to note data of relatively strong intensity in a darker color than a note symbol related to note data of relatively weak intensity.

In an embodiment, the apparatus for providing a spiral curve type music sheet may provide a three-dimensional spiral curve type music sheet. Specifically, the apparatus for providing a spiral curve type music sheet may display the duration of the note data through the spiral curve type music sheet, which is in the form of the three-dimensional roll in which the spiral curve is extended in the direction perpendicular to the spiral curve on the plane. For example, the apparatus for providing a spiral curve type music sheet may display the note symbol on the three-dimensional spiral curve type music sheet by extending the length of the note symbol in the direction perpendicular to the spiral curve by the durations of the note data. In this case, the apparatus for providing a spiral curve type music sheet may display only valid note symbol by controlling whether or not the note symbols on the spiral curve type music sheet are displayed according to the progress of music including a plurality of note data.

As another example, the apparatus for providing a spiral curve type music sheet may transform the sound input from the outside into the plurality of note data having different frequencies through the Fourier transformation, and calculate the magnitudes and phase angles of each of the plurality of note data. The apparatus for providing a spiral curve type music sheet may determine the points on the spiral curve corresponding to the magnitudes and phase angles of each of the plurality of note data as the note symbol positions, and display the note symbols related to the plurality of note data at the note symbol positions, thereby expressing the plurality of note data corresponding to the overtone on the spiral curve type music sheet.

The use of the term "above" and similar directive terms in the specification of the present disclosure (especially in the claims) may be in both the singular and the plural. In addition, when a range is described in the present disclosure, each individual value constituting the range is described in the detailed description of the invention as including the invention to which individual values belonging to the range are applied (if there is no description to the contrary).

According to embodiments of the present disclosure, it is possible to allow a user to easily recognize notes based on a position of a note symbol by displaying all notes without using a sharp or flat symbol through a spiral curve type music sheet in which different notes are displayed at different positions on a spiral curve based on a pitch of the note.

According to embodiments of the present disclosure, it is possible to intuitively recognize chords through a position differences between note symbols by determining a point on a spiral curve corresponding to a magnitude and a phase angle of each of a plurality of note data as a note symbol position, and displaying each note symbol at the determined note symbol position.

According to embodiments of the present disclosure, it is possible to enable various notes to be displayed unlike the existing music sheet in which it is difficult to display notes with a difference of more than one octave by providing a spiral curve type music sheet capable of displaying note data in multiple octaves.

According to embodiments of the present disclosure, it is possible to display not only notes based on a 12 tone scale, but also microtones having a general frequency on a spiral curve type music sheet.

According to embodiments of the present disclosure, it is possible to visually express a tone of a musical instrument by displaying an overtone obtained from a sound played on the musical instrument on a spiral curve type music sheet.

According to embodiments of the present disclosure, it is possible to easily transform an existing music sheet into a spiral curve type music sheet by creating note data from an existing music sheet and providing the spiral curve type music sheet that displays a note symbol related to the note data.

The steps may be performed in an appropriate order if there is no explicit order or description to the contrary with respect to the steps constituting the method according to the present disclosure. The present disclosure is not necessarily limited according to the description order of the steps. The use of all examples or exemplary terms (for example, etc.) in the present disclosure is simply to elaborate the present disclosure and, unless otherwise limited by the claims, the range of the present disclosure is not limited due to the examples or exemplary terminologies. In addition, those skilled in the art will recognize that various modifications, combinations, and changes may be made in accordance with design conditions and factors within the scope of the appended claims or their equivalents.

Therefore, the spirit of the present disclosure should not be limited to the above-described embodiments, and it is to be appreciated that not only the claims described below, but also all scopes equivalent to or changed from these claims fall within the scope of the present disclosure.

What is claimed is:

1. An apparatus for providing a spiral curve type music sheet, comprising:

a memory configured to store a spiral curve type music sheet in which different notes are displayed at different positions in a spiral curve based on a pitch of the note, and note data; and a processor configured to determine a note symbol position related to the note data on the spiral curve in the spiral curve type music sheet based on a frequency of the note data, wherein the spiral curve type music sheet matches a two-dimensional polar coordinate complex plane, and the processor calculates a magnitude and a phase angle of the note data in the polar coordinate complex plane based on the frequency of the note data, and determines a point on the spiral curve corresponding to the magnitude and phase angle of the note data as the note symbol position.

2. The apparatus of claim 1, further comprising:

an input interface configured to receive a sound input from an outside, wherein the processor transforms the received sound into a plurality of note data having different frequencies by Fourier transformation, calculates the magnitudes and phase angles of each of the plurality of note data, and determines the points on the spiral curve corresponding to the magnitudes and phase angles of each of the plurality of note data as the note symbol position.

3. The apparatus of claim 1, wherein the note symbol positions are radially disposed, spaced apart from each other around a central point, and are determined as any one of a plurality of points where the spiral curve intersects with a plurality of radiating lines corresponding to different musical scales, respectively.

4. The apparatus of claim 3, wherein the note symbol positions of different note data within the same octave are determined as note symbol positions having different distances and phase angles from the central point.

5. The apparatus of claim 3, wherein note symbol positions of notes having only octave difference is among the different notes are determined as note symbol positions having different distances from the central point and the same phase angle.

6. The apparatus of claim 3, further comprising:

a display configured to display a spiral curve type music sheet displaying the notations at note symbol positions of each note data, and a radiating line associated with a semitone among the plurality of radiating lines is displayed on the display in a different color or different form from other radiating lines.

7. The apparatus of claim 1, wherein the processor differently displaying the note symbols related to the note data on the spiral curve type music sheet based on a duration of the note data.

8. The apparatus of claim 1, wherein the spiral curve type music sheet is in a form of a three-dimensional roll in which the spiral curve extends in a direction perpendicular to a spiral curve on a plane, and the processor extends a length of the note symbol in a direction perpendicular to the spiral curve by durations of the note data, and displays the note symbol on the spiral curve type music sheet.

9. A method of providing a spiral curve type music sheet implemented by an apparatus for providing a spiral curve type music sheet, the method comprising: maintaining a spiral curve type music sheet, in which different notes are displayed at different positions on a spiral curve based on a pitch of a note, and note data in a memory in the apparatus for providing a spiral curve type music sheet; and determining a note symbol position related to the note data on the spiral curve in the spiral curve type music sheet based on a frequency of the note data in the apparatus for providing a spiral curve type music sheet, wherein the spiral curve type music sheet matches a two-dimensional polar coordinate complex plane, and the determining of the note symbol position includes calculating a magnitude and a phase angle of the note data in the polar coordinate complex plane based on the frequency of the note data, and determining a point on the spiral curve corresponding to the size and phase angle of the note data as the note symbol position.

10. The method of claim 9, further comprising:

transforming a sound received from an outside into a plurality of note data having different frequencies by Fourier transformation in the apparatus for providing a spiral curve type music sheet; and calculating magnitudes and phase angles of each of the plurality of note data, and determining points on the spiral curve corresponding to the magnitudes and phase angles of each of the plurality of note data as the note symbol position in the apparatus for providing a spiral curve type music sheet.

11. The method of claim 9, wherein the note symbol positions are radially disposed, spaced apart from each other around a central point, and are determined as any one of a plurality of points where the spiral curve intersects with a plurality of radiating lines corresponding to different musical scales, respectively.

12. The method of claim 11, further comprising:

displaying a spiral curve type music sheet displaying a note symbol at the note symbol position in the apparatus for providing a spiral curve type music sheet, wherein a radiating line associated with a semitone among the plurality of radiating lines is displayed in a different color or different form from other radiating lines.

* * * * *